(12) United States Patent
Grove-Nielsen

(10) Patent No.: US 11,400,660 B2
(45) Date of Patent: Aug. 2, 2022

(54) PRESSURE SENSITIVE FLOW DISTRIBUTION MEDIUM FOR VARTM

(71) Applicant: Siemens Gamesa Renewable Energy A/S, Brande (DK)

(72) Inventor: Erik Grove-Nielsen, Roslev (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 779 days.

(21) Appl. No.: 15/802,624

(22) Filed: Nov. 3, 2017

(65) Prior Publication Data

US 2018/0050503 A1  Feb. 22, 2018

Related U.S. Application Data

(63) Continuation of application No. 14/171,946, filed on Feb. 4, 2014, now Pat. No. 9,815,245.

(30) Foreign Application Priority Data

Feb. 5, 2013  (EP) ..................... 13154040

(51) Int. Cl.
*B29C 70/44* (2006.01)
*B29C 70/54* (2006.01)
*B29C 67/24* (2006.01)
*C08F 10/06* (2006.01)
*C08G 63/00* (2006.01)
*C08G 69/00* (2006.01)

(52) U.S. Cl.
CPC .............. *B29C 70/44* (2013.01); *B29C 67/24* (2013.01); *B29C 70/443* (2013.01); *B29C 70/547* (2013.01); *C08F 10/06* (2013.01); *C08G 63/00* (2013.01); *C08G 69/00* (2013.01)

(58) Field of Classification Search
CPC ..... B29C 67/24; B29C 70/443; B29C 70/547; B29C 70/48; B29C 70/44; B29C 43/3642
See application file for complete search history.

(56) References Cited

U.S. PATENT DOCUMENTS

| | | | | |
|---|---|---|---|---|
| 4,902,215 A * | 2/1990 | Seemann, III | ........ | B29C 70/443 425/389 |
| 4,942,013 A * | 7/1990 | Palmer | ................ | B29C 43/3642 156/285 |
| 5,439,635 A * | 8/1995 | Seemann | ............ | B29C 33/0066 264/154 |
| 2003/0025231 A1* | 2/2003 | Slaughter | .............. | B29C 43/003 425/389 |

(Continued)

FOREIGN PATENT DOCUMENTS

WO   WO-2012026980 A2 *  3/2012  ........... B29C 70/443

*Primary Examiner* — Matthew J Daniels
(74) *Attorney, Agent, or Firm* — Schmeiser Olsen Watts LLP

(57) ABSTRACT

A method for manufacturing a fibre reinforced composite by means of a vacuum assisted resin transfer moulding, comprising the steps of placing a fibre material in a mould, placing a flow distribution medium onto the fibre material, and covering the fibre material (1) and the flow distribution medium with a vacuum foil for forming a closed mould cavity between the mould and the vacuum foil is described. It is characterised in using a flow distribution medium with a thickness depending on a pressure gradient over the vacuum foil.

10 Claims, 4 Drawing Sheets

(56) References Cited

U.S. PATENT DOCUMENTS

Figure 1:
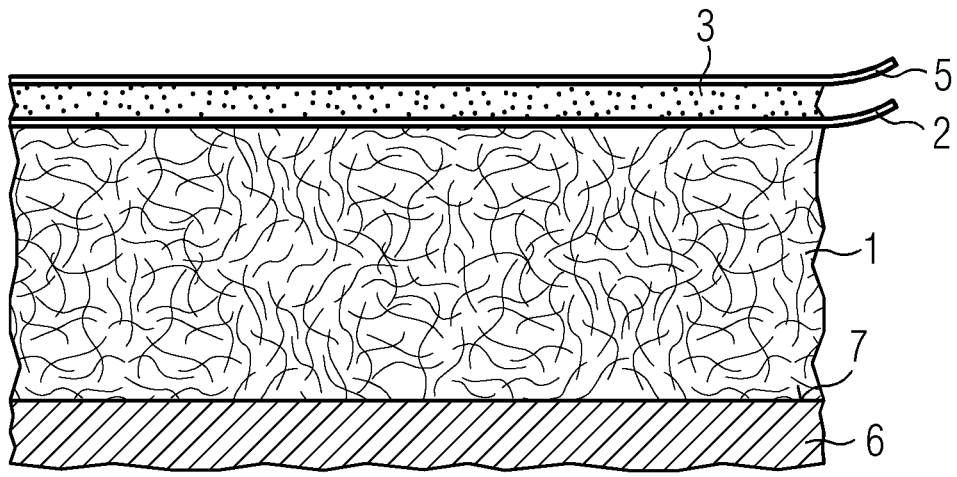

| | | | | |
|---|---|---|---|---|
| 2003/0077965 A1* | 4/2003 | Mack | ............... | B29C 70/443 |
| | | | | 442/180 |
| 2009/0146433 A1* | 6/2009 | Althoff | ............... | F03D 1/065 |
| | | | | 290/55 |
| 2013/0175740 A1* | 7/2013 | Shinoda | ............... | B29C 70/443 |
| | | | | 264/571 |

* cited by examiner

PRESSURE SENSITIVE FLOW DISTRIBUTION MEDIUM FOR VARTM

CROSS-REFERENCE TO RELATED APPLICATIONS

This application is a continuation application of U.S. application Ser. No. 14/171,946, filed Feb. 4, 2014, and entitled, "Pressure Sensitive Flow Distribution Medium for VARTM," which claims priority to European Patent Application No. 13154040.3, having a filing date of Feb. 5, 2013, the entire contents of which are hereby incorporated by reference.

FIELD OF TECHNOLOGY

The following relates to a method for manufacturing a fibre reinforced composite by means of a vacuum assisted resin transfer moulding (VARTM).

BACKGROUND

Fibre reinforced plastic composites are used in a variety of technical products such as Cars, Aeroplanes, Wind Turbine Blades, Storage tanks, etc. In many cases, the fibre parts are placed in a mould. The mould is closed by a second mould part or a plastic liner is placed over the mould, and vacuum is applied to the fibre filled hollow structure. A liquid resin is then infused from a mixing facility. The mixed resin fills out the space between fibres, and finally cures. In this way, a rigid reinforced composite structure is made.

The resin flows into the mould cavity through inlet holes distributed over the mould surface. A typical example of this process is the Vacuum Assisted Resin Transfer Moulding, called VARTM.

Resin flow channels may be used to enable a fast flow to certain areas of the mould system. Often a special resin flow medium is placed between the vacuum foil and the glass fibres to be wetted by the resin. When the resin is sucked into the mould cavity, it flows fast through the flow medium, whereas the glass material is denser and exhibits a higher resistance to the resin flow. Partly forced by vacuum and partly by capillary forces, the resin is further distributed into the fibre material. As the resin flows over an area, the foremost area of the resin in movement is called the resin flow front. As the resin travels through the flow medium, the static vacuum declines behind the flow front. The highest vacuum is found in the air filled space in front of the flow front. Therefore, the resin flows fast through the flow medium, passing over the fibre material to be wetted.

It would be desirable to have a slower movement of the flow front, and a higher flow of resin perpendicular to the surface, from the flow medium and into the laminate. A fibre layout with unidirectional fibres, such as a non-woven roving laminate, especially with high fibre content, will have a much reduced resin flow, due to the compact build-up of fibres.

To enable a correct wetting of all fibres inside the mould, a complex layout of resin channels and flow sheets are placed in the mould. In thick sandwich constructions, the core panels, such as balsa wood panels, are often equipped with cut channels to enable faster flow of resin along the core material surface. This is done to enhance the penetration of resin from both sides of a laminate, to get the fastest possible wetting of the total fibre stack. However, the extra resin channels take up extra amounts of resin, which makes the parts heavier and more expensive. For laminates with high fibre content, such as unidirectional roving laminates, it is necessary to include layers of open fabrics that enable a better resin flow. The incorporation of open fabrics for better flow yields laminates with reduced modulus of elasticity (E-modulus) and heavier weight due to the higher resin content.

SUMMARY

An aspect relates to an advantageous method for manufacturing a fibre reinforced composite by means of vacuum assisted resin transfer moulding which improves a homogeneously penetration of resin into the laminate and reduces the production time. Moreover, an advantageous flow distribution medium is provided for use in a method for manufacturing a fibre reinforced composite by means of vacuum assisted transfer moulding.

The inventive method for manufacturing a fibre reinforced composite, for example a fibre reinforced plastic composite, by means of vacuum assisted resin transfer moulding comprises the steps of placing fibre material in a mould, placing a flow distribution medium onto the fibre material, and covering the fibre material and the flow distribution medium with a vacuum foil for forming a closed mould cavity between the mould and the vacuum foil. A flow distribution medium is used which has a thickness depending on the pressure gradient of the vacuum foil.

For example, a flow distribution medium is introduced, which changes its thickness as a function of the surface pressure gradient over the vacuum foil, which covers the fibre stack layup. When a roving laminate, under a vacuum foil, is infused, the vacuum inside the roving material will be reduced by the flow resistance as the flow front moves forward. At the most, the pressure under the foil may go back to atmospheric pressure, which means that there is no consolidation pressure onto the foil and fibre stack. The flow distribution medium may comprise a surface pressure sensitive material which has a stiffness, which enables the material to lift the vacuum foil, and thus allow the resin from behind to flow easier towards the resin front area.

Advantageously, the flow distribution medium can be positioned directly under the vacuum foil. Moreover, the foil distribution medium can be placed immediately or directly onto the fibre material or not directly onto the fibre material.

The fibre material can comprise a number of layers of fibre material. It can form a fibre stack. Generally, the vacuum foil or vacuum bag can be a plastic vacuum foil or bag.

The flow distribution medium and the vacuum foil can be made as one piece. They can for instance be integrated into each other. For example, the vacuum bag can be integrated into the flow distribution medium. In this case, an upper or top surface of the flow distribution medium may form the vacuum bag. Alternatively, the vacuum bag may comprise the flow distribution medium.

The introduction of the described flow distribution medium into the closed mould cavity has the advantage that the flow distribution medium regulates the resin transport in proportion to the pressure gradient over the overlaying or integrated vacuum foil. Behind the resin flow front, especially long behind the flow front, the low vacuum under the vacuum foil allows the flow distribution medium, for example by means of elastic forces in a thermoplastic fibre material, to open up for passage of more resin through the flow medium. As a consequence, the homogeneity of the resin distribution in the composite or laminate is improved.

Advantageously, a peel ply can be placed between the flow distribution medium and the fibre material, for example the fibre stack. This means that the fibre material can be covered with the peel ply.

In an exemplary embodiment, the flow distribution medium has a stiffness, which enables the flow distribution medium to lift the vacuum foil. For example, the flow distribution medium can have a stiffness to lift the vacuum foil such that the distance between the fibre material or fibre stack and the vacuum foil is increased. The flow distribution medium may comprise fibre material acting as spring to lift up the vacuum foil. This can be realized by means of elastic forces in the fibre material, which may for example be thermoplastic fibre material.

The flow distribution medium can comprise nonwoven fibre material. It can for example consist of nonwoven material. The nonwoven fibre material can comprise or consist of fibre rovings. Generally, the flow distribution medium can comprise or consist of fibres, which are randomly arranged, for instance in the same way as a filter material for air filtration.

A flow distribution medium can be used which comprises fibres, the fibres having a diameter of at least 10 µm and/or maximal 500 µm. For instance, the diameter of the individual fibres can have value between 10 µm and 500 µm. The flow distribution medium can for example consist of or be made of such single fibres.

Advantageously, the flow distribution medium comprises or consists of or is made of thermoplastic material, for example thermoplastic fibre material. Moreover, the flow distribution medium can comprise polyester and/or polypropylene and/or polyamide. The flow distribution medium can for example consist of or be made of these materials. Moreover, the single fibres of the flow distribution medium can comprise or consist of polyester and/or polypropylene and/or polyamide.

The used flow distribution medium can comprise material having a thickness between 2 mm and 10 mm at 1000 mbar, which means at atmospheric pressures and in its uncompressed state. Furthermore, the material may have a thickness between 0.1 and 0.5 mm at 50 mbar, which means in its totally compressed state. The flow distribution medium can for instance consist of or can be made of this material.

Moreover, the used flow distribution medium may comprise material having a load bearing capacity between 0.3 kg/cm2 and 0.7 kg/cm2, for example between 0.4 kg/cm2 and 0.6 kg/cm2, or 0.5 kg/cm2. If the load bearing capacity of the material or fabric is defined as 0.5 kg/cm2 it means that reduction of the fabric height or thickness of the material begins at a pressure difference over the vacuum foil of 0.5 bar equal to 500 mbar.

At the flow front and shortly behind the flow front, the vacuum under the vacuum foil is at maximum, which could be for example 50 mbar. If the atmospheric pressure is 1000 mbar, then the pressure onto the flow medium will be equivalent to 0.95 kg/cm2 and the flow medium will be totally collapsed here. At a long distance behind the flow front the resin migration inside the laminate, for example the roving laminate, will be very slow, due to the flow resistance between the narrow fibre passages and the low vacuum here. As the vacuum here has dropped to a very low value, such as for example an absolute pressure of 990 or even 1000 mbar, the pressure on the flow medium from the vacuum foil is merely zero. As a result of this, the elastic forces in the flow distribution medium, for example in the thermoplastic fibre material, acts as a spring and lift up the vacuum foil. As the vacuum foil is lifted, a better passage for the resin flow is enabled under the vacuum foil, in the flow distribution medium.

The used flow distribution medium can comprise a number of layers, for example two or more layers. A bottom layer—nearest to the fibre laminate stack—can be a constant flow resistant layer, and the top layer can be a surface pressure sensitive layer. Thus, the thickness of the layer and the flexibility of the compressible part could be tailor-made for different laminates. Generally, the flow distribution medium can be built-up of two or more layers of flow distribution medium, in which some are compressible, and others have a constant flow resistance, unaffected by the surface pressure on the vacuum foil. In an exemplary embodiment, the compressible and surface pressure sensitive layer is placed nearest to the vacuum foil, which means directly under the vacuum foil or immediately at the vacuum foil.

The flexibility of the surface pressure sensitive flow distribution medium is controlled by the thickness of the fibre, the E-modulus of the fibre, for example thermoplastic fibre, the thickness of the layer and the geometry of the randomly oriented endless fibres. Also the binding of the fibres, for example by stitching or melt bonding between individual fibres may have an influence on the flexibility of the flow distribution medium. Moreover, the openness of the fibre material also defines the flow properties and the elastic flexibility. In an exemplary embodiment, a flow distribution medium is used which comprises fibres which are bond at each other. For example, the individual fibres can be bonded at each other, for example by stitching and/or melt bonding between the individual fibres.

When the resin injection is finalized, the vacuum inside the closed mould cavity can advantageously be maximized for reducing the thickness of the flow distribution medium. The vacuum can be maximized inside of at least parts of the mould. The compressible flow medium will have a reduced thickness, as it is compressed, and will thus not absorb much resin.

An additional flow distribution medium, which may be a constant flow resistance layer, can be placed between the peel ply and the flow distribution medium, as previously described, and/or between the fibre material and the flow distribution medium.

The flow distribution medium can comprise a hollow membrane produced by pultrusion, for example a pultruded hollow plastic membrane. The membrane can comprise a top layer, a bottom layer and multiple thin walls connecting the top layer and the bottom layer with each other. For example, instead of a nonwoven thermoplastic fibre material, the flow distribution medium can consist of or comprise a pultruded hollow plastic membrane with multiple lengthwise oriented thin walls, which are located between the top layer, which in turn may also act as vacuum plastic foil, and the bottom layer, which in turn also may act as a peel ply. The bottom layer may have multiple holes for resin penetration into the fibre material or laminate. As the pressure gradient rises, then the structure collapses and reduces the resin flow. At low pressure gradient, the structure opens up and increases the resin flow.

The method for manufacturing a fibre reinforced composite may for example be used for manufacturing wind turbine rotor blades or other components of wind turbines.

The inventive flow distribution medium comprises a top surface. The flow distribution medium has a thickness which depends on the pressure gradient over the top surface. The inventive flow distribution medium may generally have the same properties and advantages as the flow distribution medium which was previously described in the context of the description of the inventive method. To avoid repetition, the specific properties are not repeated again.

The present application describes the following advantages: as fibres beneath the flow distribution medium are wetted by resin, static pressure drops and the flow distribution medium opens up, thereby allowing the resin to flow faster in the direction of the flow front. A faster injection moulding is realized. A more secure moulding is done, with same consolidation pressure over the vacuum foil or over the mould area. The production time is reduced with the faster resin flow. Less expensive products can be produced due to the shorter mould time.

BRIEF DESCRIPTION

Figure 2:
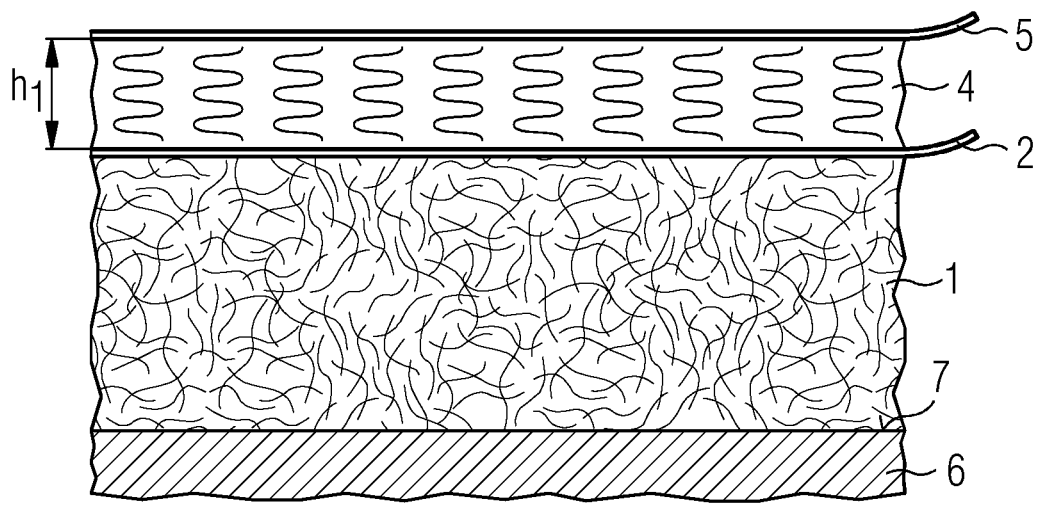
Figure 3:
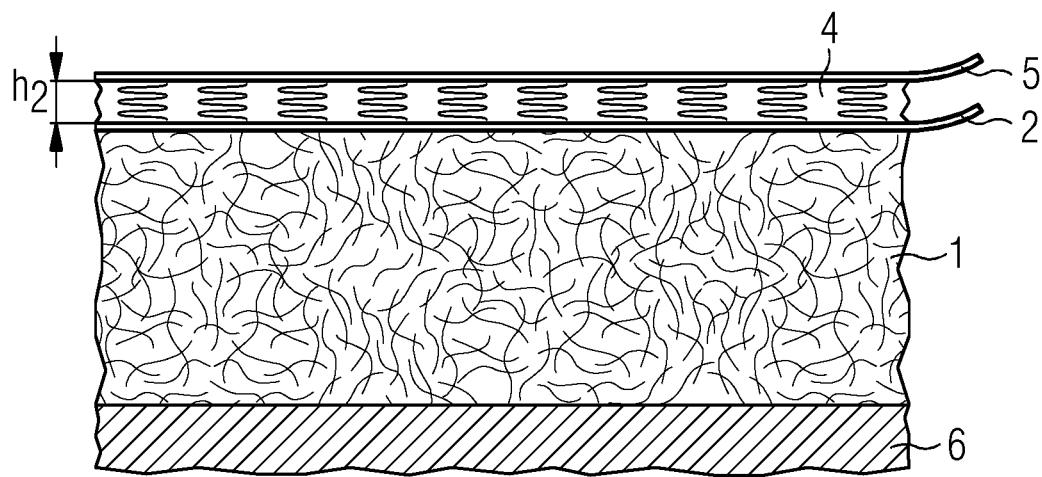
Figure 4:
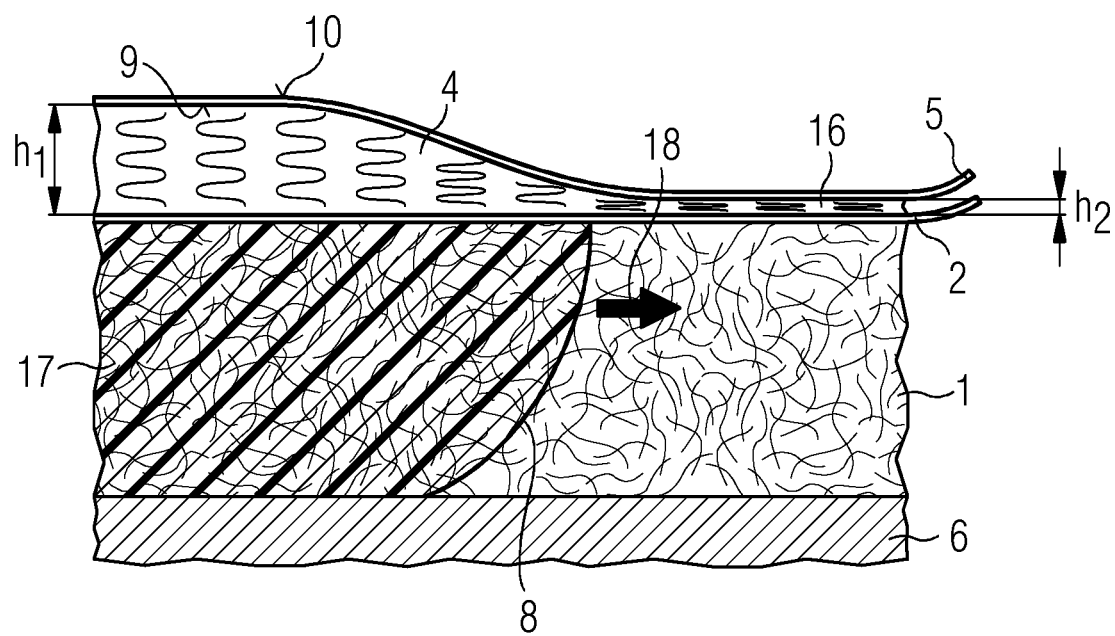
Figure 5:
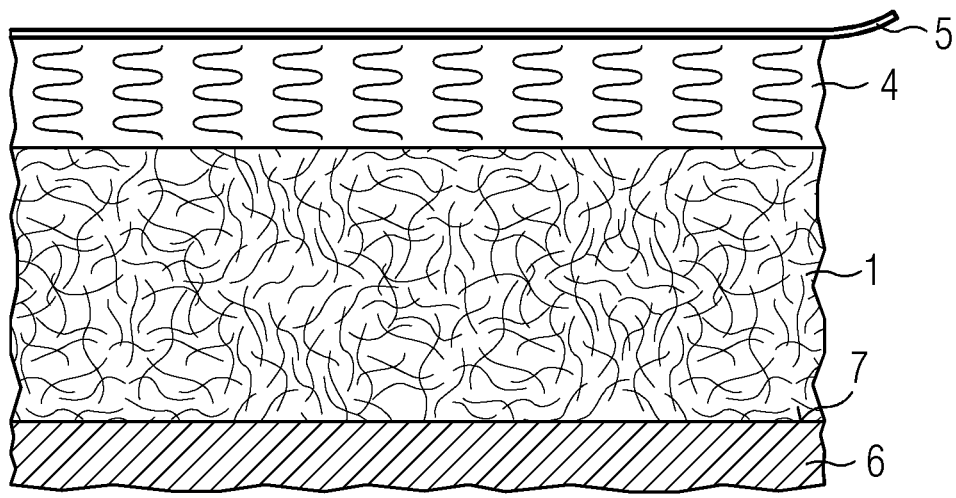
Figure 6:
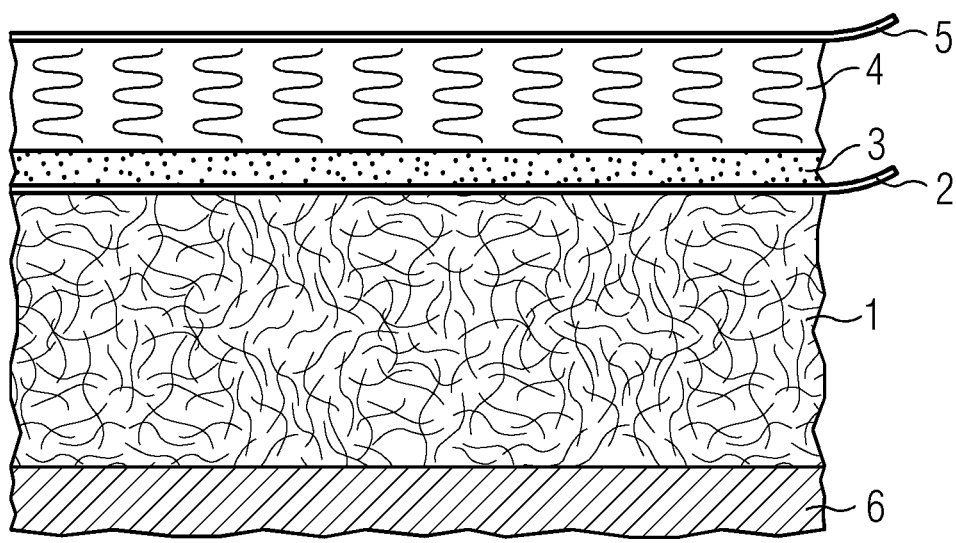
Figure 7:
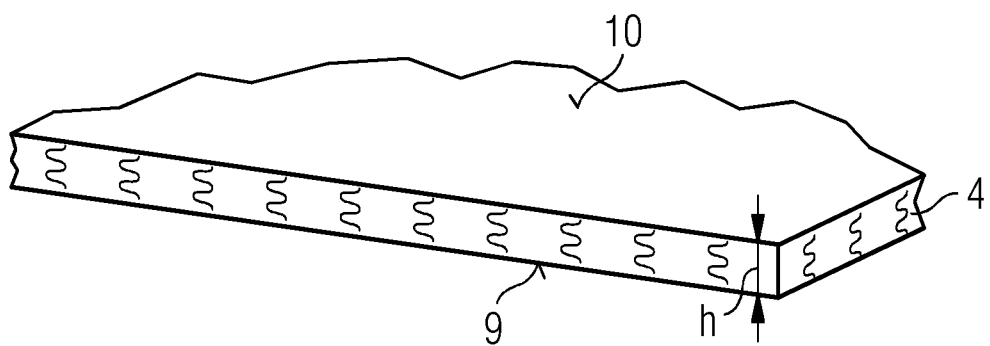
Figure 8:
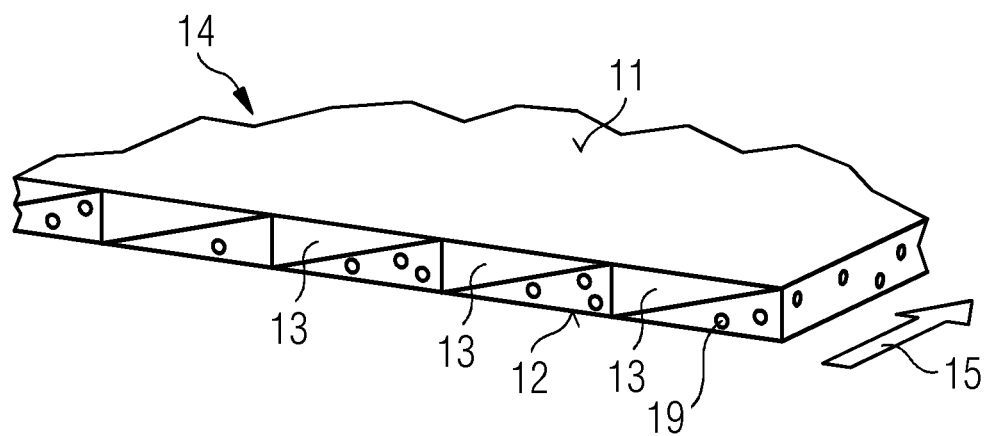

Further features, properties and advantages of the present invention will become clear from the following description of embodiments in conjunction with the accompanying drawings. The embodiments do not limit the scope of the present invention which is determined by the appended claims. All described features are advantageous as separate features or in any combination with each other, wherein:

FIG. 1 schematically shows a cross section of part of a laminate in vacuum infusion with ordinary flow helping material;

FIG. 2 schematically shows a cross section of a laminate during vacuum assisted resin transfer moulding using the inventive method;

FIG. 3 schematically a cross section of the laminate as shown in FIG. 2 at high moulding vacuum;

FIG. 4 schematically shows a cross section for a laminate in vacuum infusion showing the resin front propagation;

FIG. 5 schematically shows a simpler variant of the arrangement shown in FIG. 2;

FIG. 6 schematically shows a cross section for a laminate in vacuum infusion with a flow distribution material combined with ordinary flow helping material;

FIG. 7 schematically shows an inventive flow distribution medium in a sectional and perspective view; and FIG. 8 schematically shows a further variant of an inventive flow distribution medium in a sectional and perspective view.

DETAILED DESCRIPTION

FIG. 1 schematically shows a cross section of a part of a laminate in vacuum infusion with an ordinary flow helping material. Fibre material 1, for example a number of fibre layers are placed onto the inner surface 7 of a mould 6. The fibre material may form a fibre stack. Onto the fibre stack a peel ply 2 is positioned. Onto the peel ply an ordinary flow distribution medium 3 is placed. A vacuum plastic foil 5 covers the ordinary flow distribution medium 3. The vacuum plastic foil 5 forms a closed mould cavity together with the mould 6.

FIG. 2 schematically shows a cross section of a laminate during vacuum-assisted resin transfer moulding using the inventive method. In FIG. 2 the fibre material 1, for example comprising a number of fibre layers forming a fibre stack, is covered by a peel ply 2. An expanded surface pressure sensitive flow distribution medium 4 is positioned onto the peel ply 2. A vacuum foil 5, for example a vacuum plastic foil, is laid directly onto the flow distribution medium 4. In FIG. 2 the situation is shown for low moulding vacuum, for example at a pressure between 500 and 1000 mbar. The thickness of the flow distribution medium 4 at this pressure is indicated by $h_1$.

FIG. 3 schematically shows a cross section of the laminate as shown in FIG. 2 at high moulding vacuum. The flow distribution medium has a reduced thickness $h_2$ due to the reduced pressure inside the closed mould cavity. The pressure within the closed mould cavity in FIG. 3 may for example be at a value between 500 mbar and 50 mbar.

FIG. 4 schematically shows a cross section for a laminate in vacuum infusion showing the resin front propagation. In FIG. 4 the resin 17 propagates through the fibre material or laminate 1 due to the vacuum applied to the closed mould cavity. The main direction of the propagation of the resin flow front 8 is indicated by an arrow 18.

The portion of the flow distribution medium 4 which is located in front of the resin flow front 8 is indicated by reference numeral 16 and shows the flow distribution medium in a compressed state, which means at a reduced thickness $h_2$. The portion of the flow distribution medium that is closed behind the flow front 8 is indicated by reference numeral 4 and show the flow distribution medium in a non-compressed state due to the resin propagation within the structure.

The resin flow within the flow distribution medium 4 behind the flow front 8 causes a reduced gradient within the vacuum foil 5, which means between the upper surface 9 and the lower surface 10 of the vacuum foil 5. The portion 16 of the flow distribution medium is collapsed. The resin filled laminate creates a drop in vacuum and the portion 4 of the flow distribution medium increases its thickness due to spring forces or elastic forces and lift up the vacuum foil 5.

FIG. 5 schematically shows a simpler variant of the arrangement shown in FIG. 2. In the embodiment shown in FIG. 5, the flow distribution medium 4 is positioned directly onto the fibre material 1. The peel ply 2 was omitted.

A further variant is shown in FIG. 6. FIG. 6 schematically shows a cross section for a laminate in vacuum infusion with a flow distribution material, as previously described, combined with ordinary flow helping material. In FIG. 6 an ordinary flow helping material 3 is placed between the pressure sensitive flow distribution material 4 and the peel ply 2 and/or the fibre material 1. In the variant shown in FIG. 5, the peel ply 2 may be omitted.

In all described variants of FIGS. 2 to 6, the flow distribution medium 4, 16 changes its thickness h as a function of the surface pressure gradient over the vacuum foil 2, which covers the fibre stack layup 1. When a for example roving laminate 1, under a vacuum foil, is infused with resin, the vacuum inside the laminate 1, for example roving laminate, will be reduced by the flow resistance as the flow front 8 moves forward. At most, the pressure under the foil 5 may go back to atmospheric pressure, which means that there is no consolidation pressure onto the foil 5 and fibre stack 1.

The surface pressure sensitive material 4, 6, has a stiffness, which enables the material to lift the foil 5, and thus allow the resin 17 from behind to flow easier towards the resin front area. The flow distribution medium 4, 6 can consist of a nonwoven fibre material with fibres randomly arranged in the same way as a filter material for air filtration. The fibres, which can have diameters from 10 µm to 500 µm, can be made of a thermoplastic material such as polyester, polypropylene, polyamide known from the textile industry. As an example, the material can have a thickness of 2 to 10 mm in its uncompressed state, and only 0.1 to 0.5 mm in its totally compressed state. The material can have a load bearing capacity of 0.5 kg/cm³, which means that a reduction of the fabric height or thickness h begins at a pressure difference over the vacuum foil 5 of 0.5 bar equal to 500 mbar.

At the flow front 8, and shortly behind this, the vacuum under the vacuum foil 5 is at maximum, which may be 50 mbar. If the atmospheric pressure is 1000 mbar, then the pressure onto the flow medium will be equivalent to 0.95 kg/cm³ and the flow distribution medium will be totally collapsed here. At a low distance behind the flow front 8 the resin migration inside the roving laminate will be very slow due to the flow resistance between the narrow fibre passages and the low vacuum there. As the vacuum there has dropped to a very low value, such as for example an absolute pressure of 990 mbar or even 1000 mbar, the pressure on the flow distribution medium 4, 6 from the vacuum foil 5 is nearly zero. As a result of this, the elastic forces in the thermoplastic fibre material 4, 6 act as a spring and lift up the vacuum foil 5. As the vacuum foil 5 is lifted, a better passage for the resin flow is enabled under the vacuum foil 5 in the flow distribution medium 4, 6.

The flow medium can have a combination of two or more layers. A bottom layer—nearest to the fibre laminate stack 1—can be a constant flow resistance layer, as for example shown in FIG. 6, and a top layer can be a surface pressure sensitive layer 4, 6. Thus, the thickness of the layers and the flexibility of the compressible part may be tailor-made for different laminates.

FIG. 7 schematically shows an inventive flow distribution medium in a sectional and perspective view. The flow distribution medium 4 comprises an upper surface 10 and a bottom surface 9. The flow distribution medium 4 has a thickness h. The thickness h depends on the surface pressure gradient over the upper surface 10 or over a layer, for example a vacuum foil 5, which is placed directly onto the upper surface 10. This means, that the thickness h is a function of the surface pressure gradient. The flow distribution medium can have the same properties and advantages as the flow distribution medium, which was previously described in conjunction with the inventive method.

FIG. 8 schematically shows a further variant of an inventive flow distribution medium in a sectional and perspective view. The flow distribution medium comprises a pultruded hollow plastic membrane. It comprises a top layer 11 and a bottom layer 12 and multiple lengthwise oriented thin walls 13, which connect the top layer 11 and the bottom layer 12. The flow direction or lengthwise direction is indicated by an arrow 15. The top layer 11 can act as vacuum plastic foil. The bottom layer 12 can act as a peel ply. Moreover, the bottom layer 12 may comprise multiple holes 19 for resin penetration into the laminate. As the pressure gradient at the top layer 11 rises, then the structure collapses and reduces the resin flow. At low pressure gradient, the structure opens up.

The invention claimed is:

1. A method comprising:
    applying a vacuum to a closed mould cavity to cause a flow of resin to propagate through a fibre material of the closed mould cavity, and, as the resin infuses the fibre material, a drop in the vacuum occurs resulting in an increase of a thickness of a flow distribution medium above infused fibre material and behind a resin flow front, wherein the increase in the thickness of the flow distribution medium proximate the resin flow front lifts a vacuum foil covering the flow distribution medium ahead of the resin flow front so that the resin propagates through the fibre material with less resistance;
    wherein an additional flow distribution medium that is a different material than the flow distribution material is disposed directly below the flow distribution material, the additional flow distribution medium being coextensive with the flow distribution medium across the closed mould cavity;
    wherein the vacuum foil is laid directly on top of the flow distribution medium, and a peel ply is disposed between the additional flow distribution medium and the fibre material.

2. The method as claimed in claim 1, wherein the flow distribution medium has a stiffness that enables the flow distribution medium to lift the vacuum foil.

3. The method as claimed in claim 1, wherein the flow distribution medium comprises nonwoven fibre material.

4. The method as claimed in claim 1, wherein the flow distribution medium comprises fibres, the fibres having a diameter of at least 10 μm and/or maximal 500 μm.

5. The method as claimed in claim 1, wherein the flow distribution medium comprises thermoplastic material.

6. The method as claimed in claim 1, wherein the flow distribution medium comprises polyester and/or polypropylene and/or polyamide.

7. The method as claimed in claim 1, wherein the flow distribution medium comprises material having a thickness between 2 mm and 10 mm at 1.000 mbar and/or between 0.1 and 0.5 mm at 50 mbar.

8. The method as claimed in claim 1, wherein the flow distribution medium comprises material having a load bearing capacity between 0.3 kg/cm² and 0.7 kg/cm².

9. The method as claimed in claim 1, wherein the flow distribution medium comprises fibres, the fibres bonded at each other.

10. The method as claimed in claim 1, further comprising:
    maximizing the vacuum inside the closed mould cavity when a resin injection is finalized for reducing the thickness of the flow distribution medium.

* * * * *